(12) United States Patent
Li et al.

(10) Patent No.: US 8,281,072 B2
(45) Date of Patent: Oct. 2, 2012

(54) DATA PROCESSING SYSTEM, CONTROLLER, AND METHOD THEREOF FOR SEARCHING FOR SPECIFIC MEMORY AREA

(75) Inventors: Huan-Sheng Li, Miaoli County (TW); Meng-Chang Chen, Taichung County (TW)

(73) Assignee: Phison Electronics Corp., Miaoli (TW)

( * ) Notice: Subject to any disclaimer, the term of this patent is extended or adjusted under 35 U.S.C. 154(b) by 770 days.

(21) Appl. No.: 12/437,832

(22) Filed: May 8, 2009

(65) Prior Publication Data
US 2010/0235899 A1    Sep. 16, 2010

(30) Foreign Application Priority Data
Mar. 10, 2009    (TW) ................................ 98107686 A

(51) Int. Cl.
*G06F 12/00* (2006.01)
(52) U.S. Cl. ........ 711/118; 711/103; 711/115; 711/156; 711/170

(58) Field of Classification Search ........................ None
See application file for complete search history.

(56) References Cited

U.S. PATENT DOCUMENTS

| 2006/0156009 A1* | 7/2006 | Shin et al. ...................... 713/176 |
| 2008/0140909 A1* | 6/2008 | Flynn et al. ................... 711/100 |

OTHER PUBLICATIONS

U.S. Appl. No. 12/414,968, filed Mar. 31, 2009, Chang, et al.

* cited by examiner

*Primary Examiner* — Shawn X Gu
(74) *Attorney, Agent, or Firm* — J. C. Patents

(57) ABSTRACT

A data processing system, a controller, and a method for searching for a specific logical block are provided. Logical blocks are searched out from a peripheral unit, where data of the searched logical blocks are not yet stored in a cache memory of a master control unit. During searching for the logical blocks, a plurality of read commands are executed. The read commands are set to read data of a plurality of separated logical blocks of the peripheral unit respectively.

30 Claims, 11 Drawing Sheets

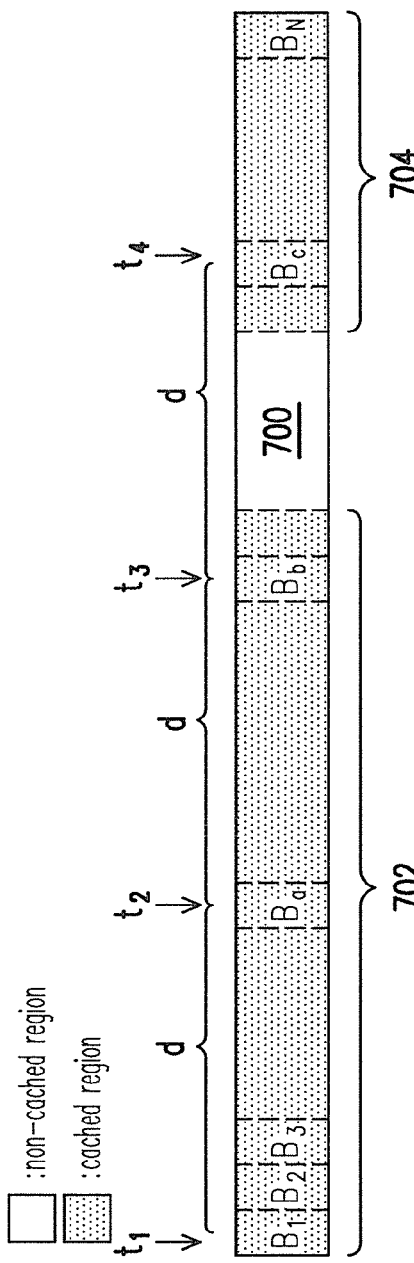
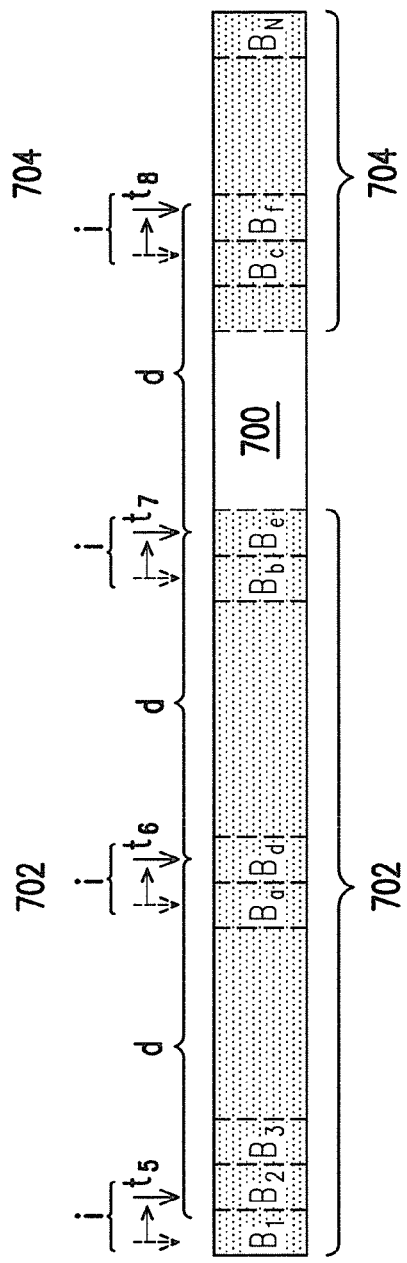
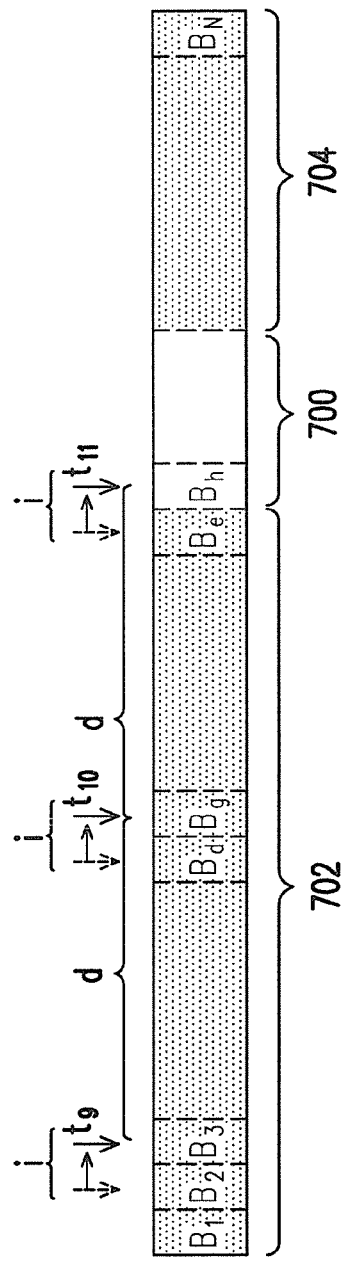

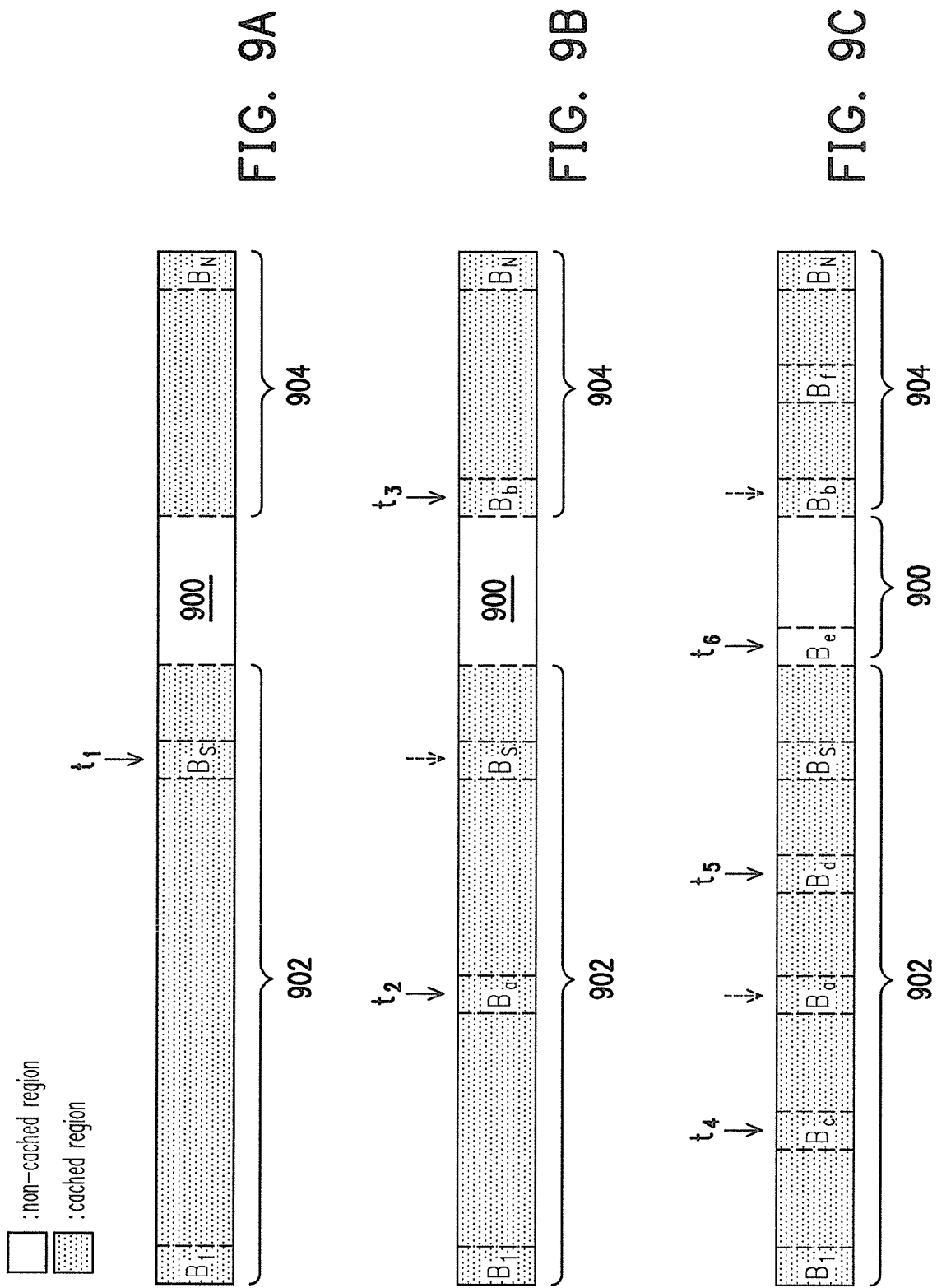

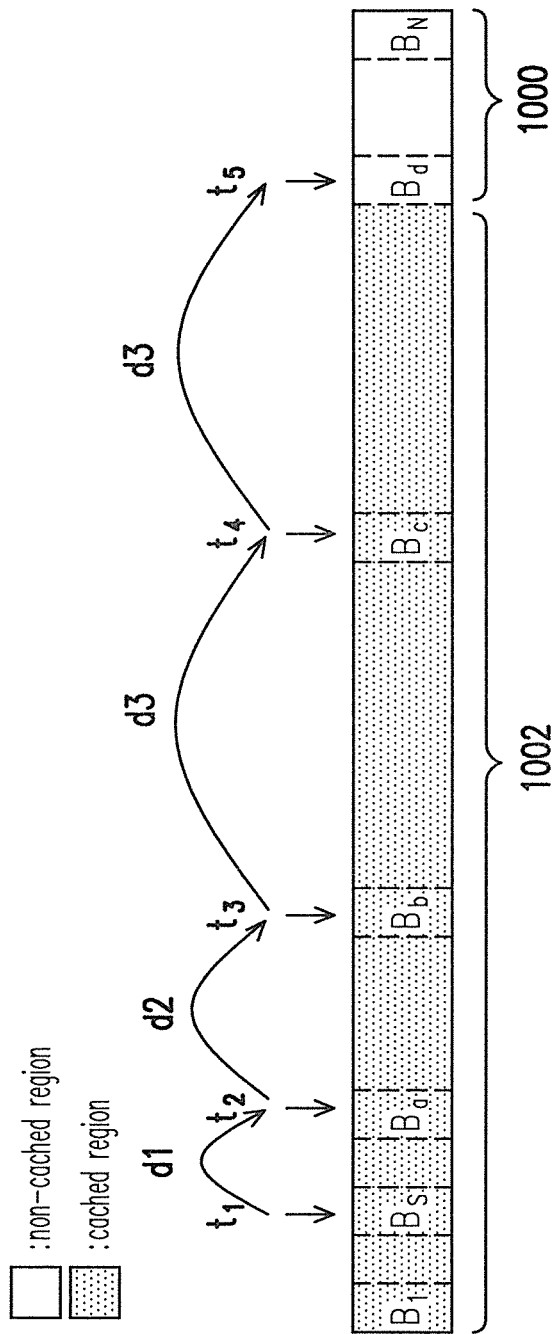
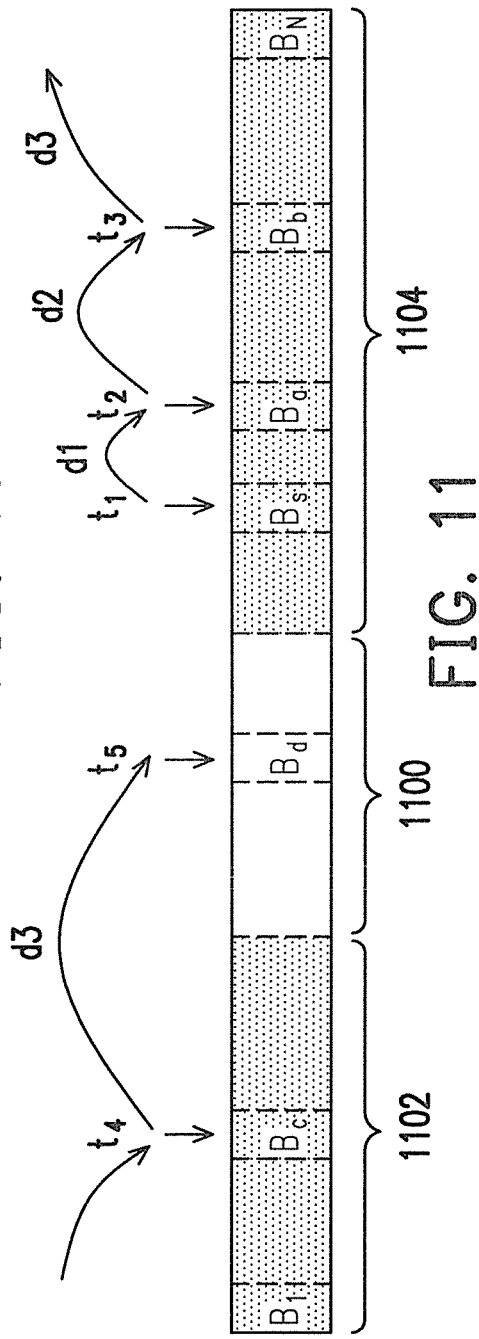
FIG. 10
FIG. 11

DATA PROCESSING SYSTEM, CONTROLLER, AND METHOD THEREOF FOR SEARCHING FOR SPECIFIC MEMORY AREA

CROSS-REFERENCE TO RELATED APPLICATION

This application claims the priority benefit of Taiwan application serial no. 98107686, filed on Mar. 10, 2009. The entirety of the above-mentioned patent application is hereby incorporated by reference herein and made a part of specification.

BACKGROUND

1. Field of the Invention

The present invention relates to a method for searching for memory blocks, and more particularly, to a data processing system, controller, and method for searching for specific memory blocks.

2. Description of Related Art

The markets of digital cameras, cellular phones, and MP3 players have expanded rapidly in recent years, resulting in escalated demand for storage media by consumers. The characteristics of data non-volatility, low power consumption, and compact size make the flash memory ideal for being built in the portable multi-media devices as cited above.

Furthermore, the user's increasing acceptance of electronic wallet and pre-deposit lead to the popularity of smart cards. A smart card is typically an integrated circuit (IC) chip which includes, for example, a microprocessor, a card operation system, a security module, and a memory module to allow holder of the smart card to perform preset operations. With the ability to provide computation, encryption, bidirectional communication and security functions, the smart card not only stores data but also protects the data stored therein. One exemplary application of the smart card is the subscriber identification module (SIM) of cellular phones that use global system for mobile communication (GSM). However, the smart card has a limit on the storage capacity. Thus, the smart card has recently begun to be combined with a large storage memory card to expand the storage capacity of the smart card.

In the conventional technology, the combination of the flash memory and the smart card uses special commands to distinguish between data transmitted to the smart card and data transmitted to the flash memory. Such special commands may result in the problem that hardware devices or driver programs are unable to support the special commands. In addition, in the conventional technology, type information of the data stream transmitted in the special commands is compared to determine whether the data stream is of the command format of the smart card. However, this method often results in confusion of command data of the smart card with regular file data (i.e., misinterpreting regular file data as data stream of the smart card).

In addition, in applications of electronic products with cache, due to the electronic products' own limits, data stream transmission between the smart card and the electronic products can not bypass the cache, preventing a response generated by the smart card from being transmitted without error back to the electronic product that the smart card is attached to and thereby restraining adoption of the smart card on such electronic product having cache. For example, in a cell phone with a Java system, since the Java system does not support commands such as "Non Cache" command which allow direct access to nonvolatile memory without using cache, it is difficult to combine the smart card and the flash memory into a memory card to be adopted in the cell phone with the Java system. Referring to FIG. 1, FIG. 1 is a functional block diagram of a master control unit 10 equipped with a memory card 12 in conventional technology. The master control unit 10 is a type of electronic product (e.g., a cell phone with a Java system) and has a cache 14. The memory card 12 includes a flash memory 16 and a smart card chip 18. The data transmission path between the master control unit 10 and the memory card 12 includes the cache 14. However, since the cache 14 temporarily stores data recently transmitted between the master control unit 10 and the memory card 12, when the master control unit 10 is to obtain data from the smart card chip 18, if the cache 14 already contains data corresponding to the read command, the cache 14 will transmit the corresponding data to the master control unit 10. However, under such structure, the response from the smart card chip 18 is often substituted by the data already in the cache 14 and thus the encryption function and communication security offered by the smart card chip 18 are compromised. In addition, in the conventional technology, searching for non-cached memory blocks in a cache takes an overly long time, thereby diminishing efficiency.

Accordingly, a method is needed for searching for non-cached memory blocks of a peripheral unit having a chip. A response from a smart card is transmitted free of error, wherein data of the logical blocks is not stored in a cache of a master control unit, thereby improving efficiency of the system.

SUMMARY

The present invention provides a method for shortening the time required to search for non-cached memory blocks.

One exemplary embodiment of the present invention provides a method for searching for a specific logical block from a peripheral unit coupled to a master control unit. Data of the specific logical block is not stored in a cache of the master control unit. The method comprises: (a) the master control unit setting an indicator such that the indicator is corresponding to a logical block of a plurality of logical blocks of the peripheral unit; (b) executing a read command set to read data from the logical block corresponding to the indicator; (c) the master control unit receiving a feedback data stream, the feedback data stream being generated as a result of execution of the read command; (d) the master control unit extracting a write token from the feedback data stream; (e) the master control unit determining whether the extracted write token and a write token stored by the master control unit have a corresponding relationship; and (f) when the extracted write token and the write token stored by the master control unit do not have the corresponding relationship, resetting the indicator and repeating the steps (b), (c), (d), and (e) until another write token extracted in the repeated step (d) is determined, in the repeated step (e), to have the corresponding relationship with the write token stored by the master control unit. A logical block corresponding to the current reset indicator and a logical block corresponding to a previous reset indicator are separated by at least one logical block of the plurality of logical blocks.

Another exemplary embodiment of the present invention provides a master control unit. The master control unit is coupled to a peripheral unit and includes a cache and a data processing module. The cache is used to temporarily store data and the data processing module is used to search for logical blocks whose data is not stored in the cache of the peripheral unit. The data processing module sets an indicator to correspond the indicator to a logical block of the plurality of logical blocks in the peripheral unit. Afterwards, the data processing module receives a feedback data stream generated as a result of execution of a read command which is set to read data from the logical block corresponding to the indicator. The data processing module extracts a write token from the feedback data stream and determines whether the extracted write token has a corresponding relationship with a write token stored in the master control unit. If the extracted write token and the write token stored in the master control unit has no corresponding relationship, the indicator is then reset until the data processing module extracts from subsequently received feedback data stream a write token having a corresponding relationship with the write token stored in the master control unit. Each feedback data stream subsequently received by the data processing module is generated as a result of execution of subsequent read commands and each subsequent read command is set to read data from a logical block corresponding to the reset indicator. A logical block corresponding to a reset indicator and a logical block corresponding to a previous reset indicator are separated by at least one logical block of the plurality of logical blocks.

Another exemplary embodiment of the present invention provides a data processing system. The data processing system includes a peripheral unit and a master control unit. The master control unit is coupled to a peripheral unit and includes a cache and a data processing module. The cache is used to temporarily store data and the data processing module is used to search for logical blocks whose data is not stored in the cache from the peripheral unit. The data processing module sets an indicator to correspond the indicator to a logical block of the plurality of logical blocks in the peripheral unit. Afterwards, the data processing module receives a feedback data stream generated as a result of the execution of a read command which is set to read data from the logical block corresponding to the indicator. The data processing module extracts a write token from the feedback data stream and determines whether the extracted write token has a corresponding relationship with a write token stored in the master control unit. If the extracted write token and the write token stored in the master control unit has no corresponding relationship, the indicator is then reset until the data processing module extracts from subsequently received feedback data stream a write token having a corresponding relationship with the write token stored in the master control unit. Each feedback data stream subsequently received by the data processing module is generated as a result of execution of subsequent read commands and each subsequent read command is set to read data from a logical block corresponding to the reset indicator. A logical block corresponding to a reset indicator and a logical block corresponding to a previous reset indicator are separated by at least one logical block of the plurality of logical blocks.

Another exemplary embodiment of the present invention provides a method for searching for a specific memory area, in which a master control unit performs searches for a specific memory area in a peripheral unit. The master control unit is coupled to a peripheral unit and stores a write token. The method includes the following. (a) An indicator is set to correspond to a logical block in a plurality of logical blocks of the peripheral unit. (b) A read command is executed, wherein the read command is set to read data from the logical block corresponding to the indicator. (c) A feedback data stream is received, wherein the feedback data stream is generated as a result of the execution of the read command. (d) A determination is made on whether the feedback data stream has a corresponding relationship with the write token according to the feedback data stream. (e) If the corresponding relationship is not found between the feedback data stream and the write token, an interval is accumulated to the indicator to reset the indicator and steps (b), (c), and (d) are repeated until the received feedback data stream and the write token have the corresponding relationship. Each of the interval(s) accumulated to the indicator is equal to or greater than the capacity of one logical block of the plurality of logical blocks and at least one of the intervals is greater than or equal to twice of the capacity of a single logical block of the plurality of logical blocks.

Another exemplary embodiment of the present invention provides a master control unit. The master control unit is coupled to a peripheral unit and includes a cache and a data processing module. The cache is used to temporarily store data and the data processing module is used to search for logical blocks whose data is not stored in the cache from the peripheral unit. The data processing module sets an indicator to correspond the indicator to a logical block of the plurality of logical blocks of the peripheral unit. Afterwards, the data processing module receives a feedback data stream generated as a result of the execution of a read command which is set to read data from the logical block corresponding to the indicator. The data processing module determines whether the feedback data stream and the write token have a corresponding relationship according to the feedback data stream. If the feedback data stream and the write token do not have the corresponding relationship, an interval is accumulated to the indicator to reset the indicator until the received feedback data stream and the write token have the corresponding relationship. Each feedback data stream subsequently received by the data processing module is generated as a result of execution of subsequent read commands and each subsequent read command is set to read data from a logical block corresponding to the reset indicator. Furthermore, each of the interval(s) accumulated to the indicator is equal to or greater than the capacity of one logical block of the plurality of logical blocks and at least one of the intervals is greater than or equal to twice of the capacity of a single logical block of the plurality of logical blocks.

Another exemplary embodiment of the present invention provides a data processing system. The data processing system includes a peripheral unit and a master control unit. The master control unit is coupled to the peripheral unit and includes a cache and a data processing module. The cache is used to temporarily store data and the data processing module is used to search for logical blocks whose data is not stored in the cache from the peripheral unit. The data processing module sets an indicator to correspond the indicator to a logical block of the plurality of logical blocks of the peripheral unit. Afterwards, the data processing module receives a feedback data stream generated as a result of the execution of a read command which is set to read data from the logical block corresponding to the indicator. The data processing module determines whether the feedback data stream and the write token have a corresponding relationship according to the feedback data stream. If the feedback data stream and the write token do not have the corresponding relationship, an interval is accumulated to the indicator to reset the indicator until the received feedback data stream and the write token have the corresponding relationship. Each feedback data stream subsequently received by the data processing module is generated as a result of execution of subsequent read commands and each subsequent read command is set to read data from a logical block corresponding to the reset indicator. Furthermore, each of the interval(s) accumulated to the indicator is equal to or greater than the capacity of one logical block of the plurality of logical blocks and at least one of the interval(s) is greater than or equal to twice of the capacity of a single logical block of the plurality of logical blocks.

The present invention improves efficiency of a system by corresponding each read command to a logical block and the corresponding logical blocks are separated with each other by at least one logical block so that logical blocks of a cache whose data is not stored in a master control unit can be promptly searched when a read command is executed to wait for a response message from a chip.

In order to make the aforementioned and other features and advantages of the present invention more comprehensible, several embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 7A to FIG. 7C illustrate a method of setting an indicator according to an embodiment of the present invention.

FIG. 9A to FIG. 9C illustrate a method of setting an indicator according to another embodiment of the present invention.

FIG. 10 and FIG. 11 illustrate a method of setting an indicator $B_P$ according to another embodiment of the present invention.

DESCRIPTION OF EMBODIMENTS

The present invention provides a data processing system, controller, and method for searching for a specific logical block from a peripheral unit coupled to a master control unit. Data of the specific logical block is not stored in a cache of the master control unit. Therefore, the logical blocks whose data is not stored in the cache of the master control unit can be effectively searched from the peripheral unit, which has a peripheral unit chip, and a response message from an other device, such as smart card, can be transmitted without error, whereby efficiency of the system is increased. For a summary description of an exemplary embodiment of the present invention, the data stream can be transmitted from the master control unit to the chip through a write command. It should be noted that the master control unit may be a cellular phone, a personal digital assistant (PDA), a personal computer, or any other electronic products having a cache. The peripheral unit may be a memory card, a storage device, or an electronic device having both a first memory unit, such as smart card, and a second memory unit, such as flash memory module. The master control unit executes a plurality of read commands and thereby response messages generated by the peripheral unit chip can be received without error. A write token is used to examine the accuracy of feedback data so that the master control unit can distinguish whether the received response message is an old response message temporarily stored in the cache or a previous updated response message generated by the peripheral unit chip. The cache as referred to herein generally denotes a memory unit that is searched for data prior to the peripheral unit is searched when the master control unit processes data. If the data to be searched for is temporarily stored in the cache, it is not required for the master control unit to read data from the peripheral unit. Several exemplary embodiments of the present invention are described in the following with reference to accompany the drawings. It should be pointed out that the exemplified embodiments are not intended to limit the present invention. For example, the above-mentioned peripheral unit chip may be a smart card chip in addition to a radio frequency identification chip, a wireless transmission chip (e.g. bluetooth chip), or a multimedia control chip (e.g. digital recording chip).

Figure 1:
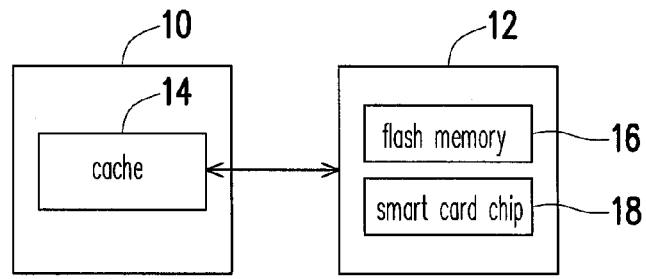
FIG. 1 is a functional block diagram of a master control unit in combination with a memory card of prior art.
Figure 2:
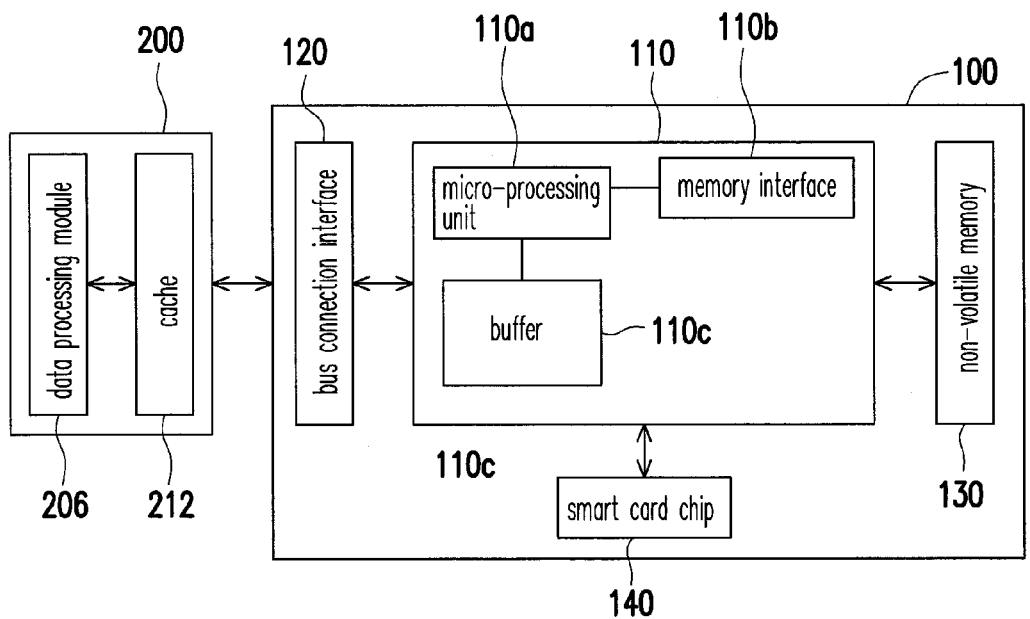
FIG. 2 is a functional block diagram of a data processing system according to an embodiment of the present invention.

Referring to FIG. 2, FIG. 2 is a functional block diagram illustrating a data processing system according to an embodiment of the present invention. The data processing system adopts the method for searching for specific non-cached area whose data is not stored in a cache 212 of a master control unit 200 from a peripheral unit 100. The data processing system includes the master control unit 200 and the peripheral unit 100. The master control unit 200 has a data processing module 206 which may be implemented as a firmware or hardware. The peripheral unit 100 has a controller 110 for controlling operations of the peripheral unit 100 and data transmission between the peripheral unit 100 and the master control unit 200. The peripheral unit 100 and the master control unit 200 are often used in combination such that the master control unit 200 is able to transmit commands and data to the peripheral unit 100. Particularly, the peripheral unit 100 further includes a smart card chip 140 for executing functions such as security verification. The controller 110 and the master control unit 200 could transmit a message to the smart card chip 140 and also transmit a response from the smart card chip 140 back to the master control 200 without error. The master control unit 200 further includes a cache 212 for temporarily storing recently-used data of the master control unit 200 so as to increase the data processing speed of the master control unit 200.

In the present embodiment, the peripheral unit 100 has a non-volatile memory 130 coupled to the controller 110 for storing regular data. However, it should be noted that the non-volatile memory 130 of this exemplary embodiment of the present invention is an optional element. The controller 110 controls operations of the peripheral unit 100 such as transmission, storage, reading, and erasing of the data stream.

The controller 110 includes a micro-processing unit 110a, a memory interface 110b, and a buffer 110c. The micro-processing unit 110a is coupled to a bus connection interface 120, executes commands transmitted from the master control unit 200 and received by the bus connection interface 120, and coordinates internal elements of the controller 110 to control operations of the controller 110. A memory interface is coupled between the non-volatile memory 130 and the micro-processing unit 110a for accessing the non-volatile memory 130. In other words, the data that the master control unit 200 is to write into the non-volatile memory 130 is converted to a format acceptable for the non-volatile memory 130 by the memory interface 110b. However, it should be noted that the non-volatile memory 130 is an optional element in this exemplary embodiment of the present invention. Therefore, in other embodiments of the present invention not adopting the non-volatile memory 130, it is not necessary to include the memory interface 110b in the controller 110. The buffer 110c is used for temporarily storing system data (e.g., logic to physical mapping table) or the data read or written by the master control unit 200. In the present embodiment, the buffer 110c is a static random access memory (SRAM). However, it should be noted that the present invention is not limited thereto, dynamic random access memory (DRAM), magnetoresistive random access memory (MRAM), phase change random access memory (PRAM), synchronous DRAM (SDRAM), or other suitable memories may also be adopted in the present invention.

The smart card chip 140 is coupled to the controller 110 for performing functions such as computation, encryption, bidirectional communication, and security verification. In the embodiment of the present invention, the smart card chip 140 is a contact type smart card chip compatible with the ISO 7816 standard. Nevertheless, it should be understood that the present invention is not limited thereto. For example, the smart card chip 140 can also be a contact or contact-less type smart card chip compatible with the ISO 14443 or ISO 15408 standards, or other security chip standards. Moreover, it should be noted that the controller 110 and the smart card chip 140 can each be an independent chip or can be integrated and packaged into a single chip.

In the embodiment of the present invention, the non-volatile memory 130 is a single level cell (SLC) NAND flash memory. However, the present invention is not limited thereto. In another embodiment of the present invention, the non-volatile memory 130 may also be a multi level cell (MLC) NAND flash memory or other suitable non-volatile memories. In addition, although it is not shown in the present embodiment, the controller 110 can further include function modules such as an error correction code (ECC) module and a power management module.

In the present embodiment, the peripheral unit 100 can be a smart card or an integrated secure digital (SD) memory card having a non-volatile memory. It should be noted that in another embodiment of the present invention, the peripheral unit 100 can also be a multimedia card (MMC) memory card or other memory devices.

The peripheral unit 100 further includes the bus connection interface 120 in addition to the controller 110, non-volatile memory 130 and smart card chip 140. The bus connection interface 120 is coupled to the controller 110 and is coupled to the master control unit 200 for receiving commands and data from the master control unit 200 and transmitting messages from the peripheral unit 100 to the master control unit 200. In the present embodiment, the bus connection interface 120 is an SD interface. It should be noted that the bus connection interface 120 can also be other suitable interfaces. For example, when the peripheral unit 100 is the MMC memory card, the bus connection interface 120 is an MMC interface.

The master control unit 200 operates on the peripheral unit 100 via the data processing module 206 to perform the method for searching for a specific memory area according to the embodiments of the present invention. In addition, it could be understood that the master control unit 200 could also include other elements such as a processor, an operating system, etc. In the present embodiment, all or parts of commands and data between the master control unit 200 and the peripheral unit 100 are transmitted through the cache 212. Furthermore, the master control unit 200 can be a personal computer, a cell phone, a notebook computer, a personal digital assistant (PDA), etc.

Figure 3:
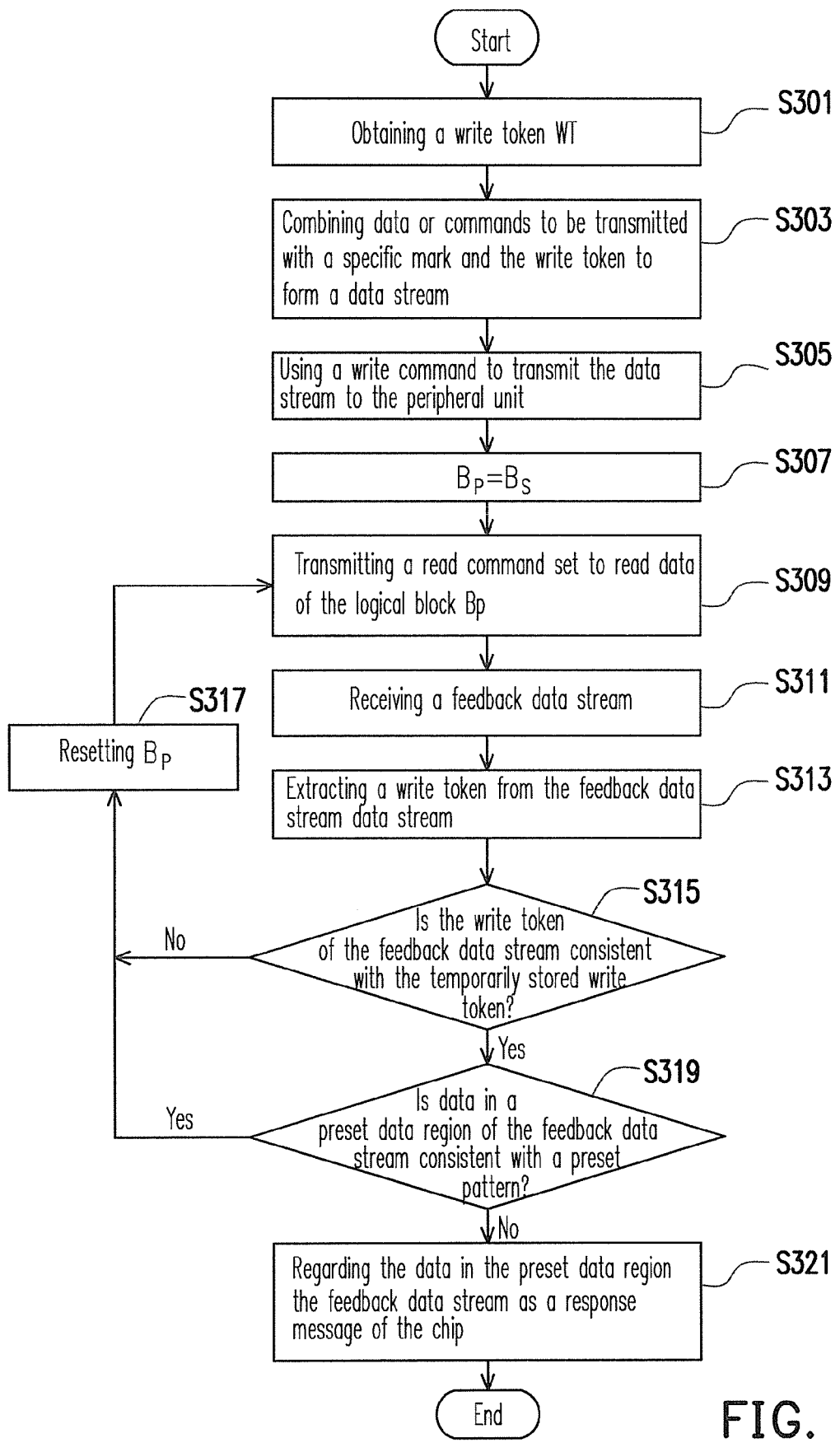
FIG. 3 is a flow chart illustrating operations of a master control unit according to the first embodiment of the present invention.
Figure 4:
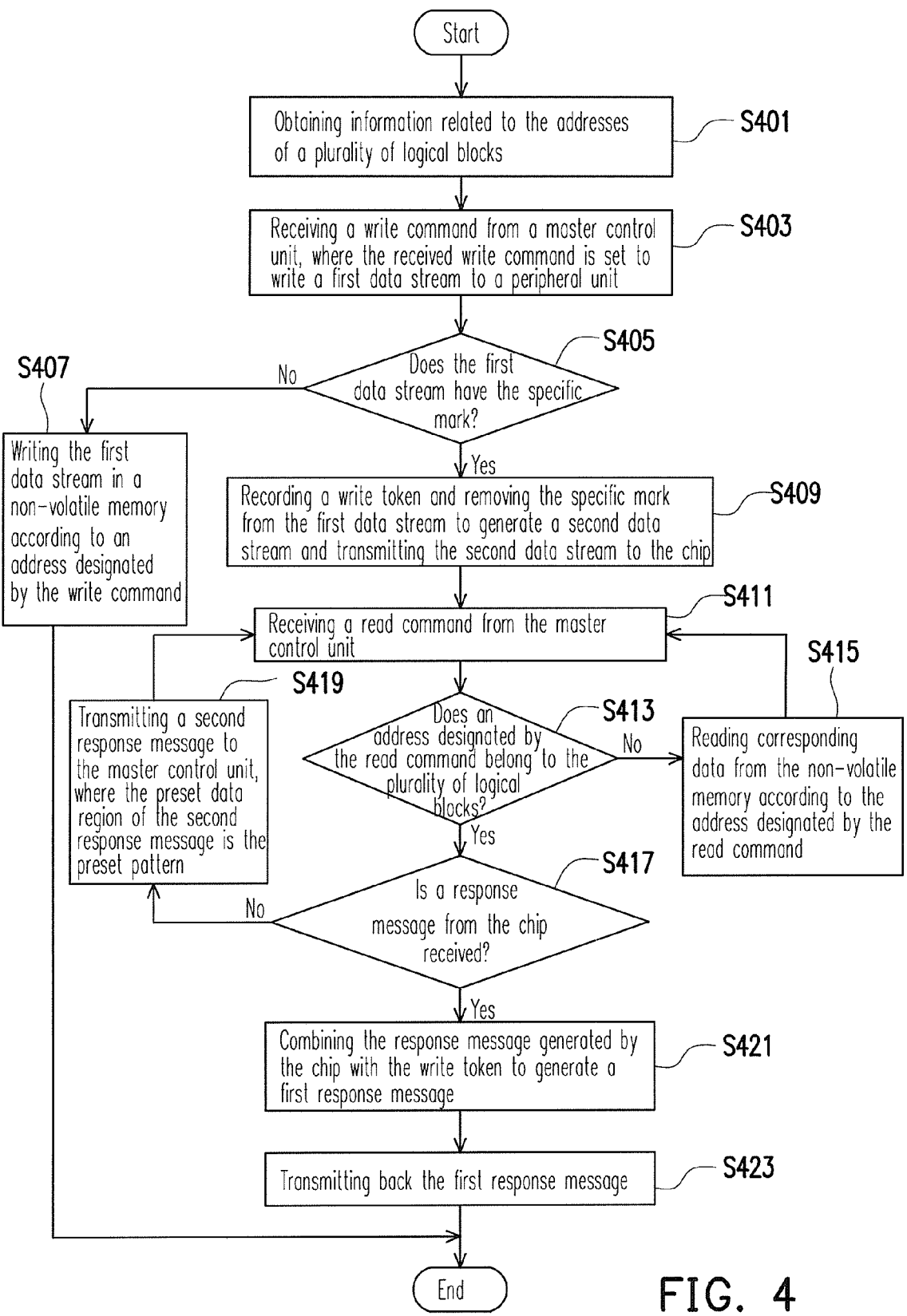
FIG. 4 is a flow chart illustrating operations of a peripheral unit according to the first embodiment of the present invention.

Accordingly, when the master control unit 200 performs operations on the peripheral unit 100 having the smart card chip 140, the controller 110 in association with the data processing module 206 of the master control unit 200 can accurately transmit data or commands to the smart card chip 140 and inerrably transmit response messages from the smart card chip 140 to the master control 200. The flow of the data transmitting procedure executed between the controller 110 and the master control unit 200 is illustrated in further detail with reference to FIG. 3 and FIG. 4 as follows. FIG. 3 illustrates a flow chart of operations of the master control unit 200 according to the first embodiment of the present invention and FIG. 4 illustrates a flow chart of operations of the peripheral unit 100 according to the first embodiment of the present invention.

Referring to FIG. 3, each time before transmitting data to the smart card chip 140, the master control unit 200 obtains or generates a write token WT and records the write token WT (step S301). The write token WT can be generated according to a set rule. For instance, the write token WT may be generated sequentially, randomly, or according to a system time. Thus, in general, every time when the master control unit 200 whishes to transmit data to the smart card chip 140, the write token WT obtained by the master control unit 200 is usually different. In addition, when the master control unit 200 transmits a write command to the smart card chip 140, the write token WT is transmitted to the controller 110, wherein the write token WT could be send behind, along with or prior to the corresponding write command. Moreover, the write token WT is also included in the data stream transmitted back to the master control unit 200. The data processing module 206 of the master control unit 200 then compares whether the write token transmitted to the controller 110 is consistent with the write token transmitted back from the controller 110 to determine the accuracy of the feedback data. In another embodiment, after the master control unit 200 generates the write token WT, the write token is edited again and is then transmitted to the controller 110 with the write command. Therefore, when the master control unit 200 transmits the write command to the controller 110, the edited write token is transmitted to the controller 110 with the write command and is also included in the data stream transmitted from controller 110 back to the master control unit 200. The data processing module 206 determines whether the feedback data stream has a corresponding relationship with the write token stored in the master control unit 200 according to the data stream transmitted back from the controller 110 so as to determine the accuracy of the feedback data. In another embodiment, the data processing module 206 of the master control unit 200 determines whether the edited write token transmitted to the controller 110 has a corresponding relationship with the write token transmitted back from the controller 110 to determine the accuracy of the feedback data. In addition, in another embodiment, when being transmitted to the controller 110, the write token after being edited by the micro-processing unit 110a is then stored in the buffer 110c or the non-volatile memory 130 and the edited write token is added to the data stream to be transmitted back to the master control unit 200.

Figure 5:
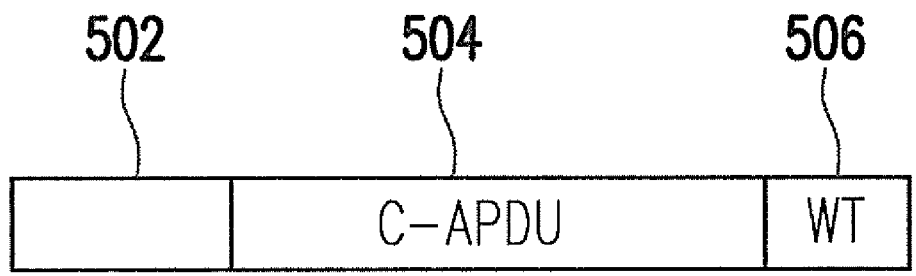
FIG. 5 illustrates a structure of a data stream adopted when the master control unit transmits commands or data to a smart card chip through a controller according to an embodiment of the present invention.

Thereafter, before the master control unit 200 transmits data or commands to the smart card chip 140 of the peripheral unit 100, the master control unit 200 combines the data or commands to be transmitted with a specific mark 502 and the write token WT to form the data stream (step S303). As shown in FIG. 5, in the present embodiment, data or a command 504 transmitted by the master control unit 200 to the controller 110 is a command-application protocol data unit (C-APDU). Moreover, after the C-APDU 504 combines with the specific mark 502 and a write token 506, a data stream 500 is formed for communication between the master control unit 200 and the smart card chip 140. However, it should be noted that in other embodiments of the present invention in which the peripheral unit 100 does not have the non-volatile memory 130, it is not necessary that the data stream 500 includes the specific mark 502. That is, to the embodiments not including the non-volatile memory 130, the specific mark 502 does not need to be included in the data stream 500. In other words, in the embodiments in which the non-volatile memory 130 is not included, when the step S303 is performed, the data stream 500 is formed only by combining the C-APDU 504 and the write token 506. In the present embodiment, the specific mark 502 is located in the most significant bit (MSB) in the data stream 500 and is formed before the C-APDU 504. The write token 506 is located in the least significant bit (LSB) in the data stream 500 and is formed after the C-APDU 504. However, it should be noted that the locations of the specific mark 502 and the write token 506 are not limited thereto. For instance, in another embodiment of the present invention, the bits of the specific mark 502 and the write token 506 are distributed in the data stream 500 by using a converter. Afterwards, the specific mark 502 and the write token 506 are extracted from the data stream 500 by using the same converter. In addition, in one embodiment of the present invention, the specific mark 502 and the write token 506 are located on the same end of the data stream 500. In another embodiment of the present invention, the specific mark 502 is located on the right end of the data stream 500 and the write token 506 is located on the left end of the data stream 500. Furthermore, in another embodiment, the specific mark is generated by the controller 110 according to addresses of the data or commands to be transmitted. In another embodiment, the master control unit 200 combines the data or commands to be transmitted with the write token WT to form the data stream and then transmits the data stream to controller 110. If the transmitted commands (e.g. read commands or write commands) contain a data read address or a data write address, the controller 110, after receiving the commands from the master control unit 200, performs the relevant operation (e.g. read or write) according to the address corresponding to the address in the command In addition, since the smart card chip 140 and the non-volatile memory 130 have different memory sections and thus in the present embodiment, it is not necessary to generate the specific mark 502.

It should also be noted that in the present embodiment, if the master control unit 200 accesses the non-volatile memory 130 instead of the smart card chip 140, then the specific mark 502 and the write token 506 are not integrated into the data stream transmitted from the master control unit 200 to the controller 110. The following description illustrates how the controller 110 determines whether the destination for the data stream transmission is the non-volatile memory 130 or the smart card chip 140 by verifying whether the specific mark 502 is included in the received data stream.

After the data stream 500 is formed, the master control unit 200 transmits the data stream 500 to the controller 110 of the peripheral unit 100 through the write command (step S305). That is, the master control unit 200 transmits the write command to the peripheral unit 100 and this write command is set to write the data stream 500 into the peripheral unit 100.

After the data stream 500 is transmitted to the controller 110, the master control unit 200 transmits a plurality of read commands sequentially to the controller 110 of the peripheral unit 100 until the master control unit 200 receives a response message generated by the smart card chip 140 from the peripheral unit 100. Each of the read commands is set to read data of a logical block in a plurality of logical blocks $B_1$ to $B_N$ of the peripheral unit 100. In the present invention, the plurality of logical blocks $B_1$ to $B_N$ may belong to a single specific file or multiple specific files. Furthermore, each logical block of the plurality of logical blocks $B_1$ to $B_N$ has the same capacity. Referring to FIG. 3, before transmitting the plurality of read commands to the peripheral unit 100, the data processing module 206 of the master control unit 200 sets an indicator $B_P$ to correspond to one logical block $B_S$ of the plurality of logical blocks $B_1$ to $B_N$ (step S307). The logical block $B_S$ is defined as a "start logical block" to represent the first logical block corresponding to the first executed read command. It should be noted that the start logical block $B_S$ may be any block of the plurality of logical blocks $B_1$ to $B_N$. For example, in some of the embodiments of the present invention, the start logical block $B_S$ is set to be the first logical block $B_1$ while in some other embodiments of the present invention, a logical block of the plurality of logical blocks $B_1$ to $B_N$ is randomly selected to be the start logical block $B_S$. When the indicator $B_P$ is set as the start logical block $B_S$, the master control unit 200 transmits a read command (step S309) and the read command is set to read data from the logical block corresponding to the read indicator $B_P$. It should also be noted that before the master control unit 200 transmits the read command, the data processing module 206 first verifies whether the cache 212 has already stored the data of the logical block corresponding to the indicator $B_P$. If so, the data processing module 206 directly reads from the cache 212 and does not read from the peripheral unit 100. On the other hand, if the cache 212 does not store the data of the logical block corresponding to the indicator $B_P$, the read command in the step S309 is then transmitted to the controller 110 of the peripheral unit 100 and is executed by the controller 110. In the present embodiment, after receiving the read command outputted by the master control unit 200, the controller 110 first determines whether the read command is set to read the data of the plurality of logical blocks $B_1$ to $B_N$. If the read command is set to read the data stored of the plurality of logical blocks $B_1$ to $B_N$, the controller 110 directly generates data with a preset pattern (e.g. all bytes thereof are zero) from a register to reduce the time consumed for reading the data.

Figure 6:
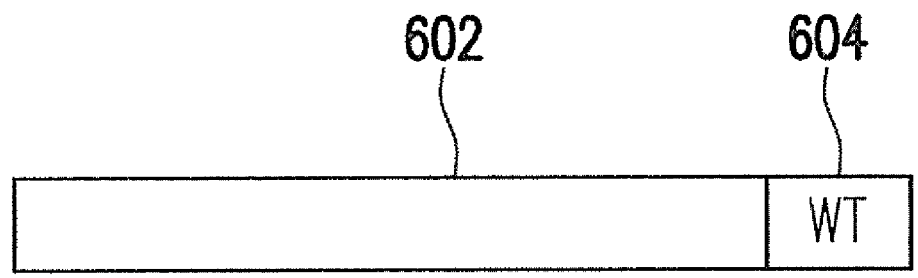
FIG. 6 illustrates a structure of a data stream transmitted from the controller back to the master control unit according to an embodiment of the present invention.

Referring again to FIG. 3, the data processing module 206 of the master control unit 200 obtains the data stream corresponding to the address to read through the peripheral unit 100 or the cache 212 (step S311). The feedback data stream includes the write token WT. In detail, when the micro-processing unit 110a receives the data stream 500 including the write token WT, the micro-processing unit 110a stores the write token WT therein. Afterwards, when the micro-processing unit 110a responds to the read command transmitted by the master control unit 200, the stored write token WT is then added to the feedback data stream. Referring to FIG. 6, FIG. 6 is a data structural diagram of a data stream 600 transmitted from the micro-processing unit 110a back to the data processing module 206. The data stream 600 includes a data region 602 and a write token region 604. The data region 602 is used to record messages generated by the smart card chip 140 or the above-mentioned data with a preset pattern and the write token region 604 is used to record the write token WT. As shown in FIG. 6, the write token region 604 is located after the data region 602. However, the present invention is not limited herein. For example, in another embodiment of the present invention, the write token region 604 is located before the data region 602.

After receiving the feedback data stream 600 in the step S311, the data processing module 206 of the master control unit 200 extracts the write token WT from the feedback data stream 600 (step S313). The write token WT extracted from the feedback data stream 600 may be edited or unedited. Afterwards, in step S315, the data processing module 206 of the master control unit 200 determines whether the write token WT in the data stream 600 corresponding to the read command is consistent with the write token stored by the master control unit 200. If the two write tokens WT are consistent with each other, then step S319 is performed. If the two write tokens WT are inconsistent, then step S317 is performed. In general, under the condition that the data processing module 206 is not re-activated, the write token WT in the data stream 600 transmitted back from the micro-processing unit 110a is often consistent with the write token WT stored by the master control unit 200. However, the master control unit 200 has the cache 212 which stores the data stream previously transmitted back from the micro-processing unit 110a. Thus, when the data processing module 206 is re-activated such that the write token WT recorded by the master control unit 200 is changed, it is possible that the write token WT recorded by the master control unit 200 may be inconsistent with the write token WT in the feedback data stream 600. Therefore, in the step S315, if the write token in the feedback data stream 600 is inconsistent with the write token stored by the master control unit 200, the feedback data stream 600 is determined to be old data temporarily stored in the cache 212 rather than a new response message generated by the controller 110 in response to the read command.

In the above step S315, the data processing module 206 determines whether the write token in the feedback data stream is consistent with the write token stored by the master control unit 200 and to determine if the feedback data stream 600 has a corresponding relationship with the write token stored by the master control unit 200 or to determine if the write token in the feedback data stream 600 has a corresponding relationship with the write token stored by the master control unit 200. In terms of a write token WT which is not edited by the data processing module 206 or the micro-processing unit 110a, the data processing module 206 can determine the above-mentioned corresponding relationship by directly comparing whether the write token WT in the feedback data stream 600 and the write token WT stored by the master control unit 200 are consistent. Specifically, if the write token WT in the feedback data stream 600 and the write token WT stored by the master control unit 200 are consistent, the above-mentioned corresponding relationship exists; otherwise, if the write token WT in the feedback data stream 600 and the write token WT stored by the master control unit 200 are inconsistent, the above-mentioned corresponding relationship does not exist. In addition, in terms of a write token WT which is edited by the data processing module 206 or the micro-processing unit 110a, when the data processing module 206 determines whether the above-mentioned corresponding relationship exists in the step S315, the data processing module 206 reverses the edited write token WT extracted from the feedback data stream 600 to be a write token that is not edited and then compares the reversed write token with the write token stored by the master control unit 200. If the reversed write token WT is consistent with the write token stored by the master control unit 200, then the above-mentioned corresponding relationship exists; otherwise, if the reversed write token WT is inconsistent with the write token stored by the master control unit 200, then the above-mentioned corresponding relationship does not exist. When the above-mentioned corresponding relationship is determined to exist, the step S319 is then performed; otherwise, the step S317 is then performed.

In the step S317, the data processing module 206 of the master control unit 200 resets the indicator $B_P$ to repeat the steps S311~S319. Subsequent descriptions illustrate in detail how the indicator $B_P$ is reset.

In the step S319, the data processing module 206 of the master control unit 200 determines whether data in the data region 602 of the feedback data stream 600 is consistent with the above-mentioned preset pattern. If the data in the data region 602 of the data stream 600 is consistent with the preset pattern, it means that the micro-processing unit 110a of the controller 110 has not yet received a response from the smart card chip 140 and then the step S317 is performed. In contrast, if the data in the data region 602 of the data stream 600 is inconsistent with the preset pattern, it means that the micro-processing unit 110a of the controller 110 may have received a response from the smart card chip 140 and then step S321 is performed and the data in the data region 602 of the data stream 600 is regarded as the response message generated by the smart card chip 140.

Even if the data in the data region 602 of the data stream 600 is not of the preset pattern, the data processing module 206 of the master control unit 200 still does not regard the data in the data region 602 of the received data stream 600 as the response message from the smart card chip 140 as long as the write token stored by the master control unit 200 and the write token in the feedback data stream 600 do not have the corresponding relationship. For the accuracy of the data, by the comparison of the write tokens WT in step S317, the master control unit 200 is prevented from erroneously identifying the data previously and temporarily stored by the cache 212 as the response message generated by the smart card chip 140. To give an example, assume that in the period between the time the master control unit 200 is switched on and the time the master control unit 200 is switched off, the data processing module 206 is activated twice. During the former activation of the data processing module 206, the master control unit 200 receives the response massage from the smart card chip 140 through the steps S301~S311 and the response message is still stored in the cache 212 memory after the data processing module 206 is re-activated. Under such condition, if the re-activated data processing module 206 does not perform the determination in the step S315 during the period of transmitting a message to the smart card chip 140 and waiting for a response from the smart card chip 140, then the data processing module 206 of the master control unit 200 may erroneously identify the former response message temporarily stored in the cache 212 to be the current response message, thereby resulting in a data error. In other words, through the determination in the step S315, the data processing module 206 can distinguish whether the received response message is the current response message or the former response message temporarily stored in the cache 212. Consequently, data accuracy is enhanced.

When the data processing module 206 of the master control unit 200 verifies that the response massage received is the current response message, the data processing module 206 regards the data in the data region 602 of the received data stream 600 as the response message from the smart card chip 140 (step S321).

Corresponding to the flow of operations of the master control unit 200 and a smart card chip 140 illustrated in FIG. 3, the flow of operations of the peripheral unit 100 and the master control unit 200 may be illustrated with reference to FIG. 4. First, when the peripheral unit 100 starts to operate, the micro-processing unit 110a of the controller 110 obtains information related to the addresses of the plurality of logical blocks $B_1$ to $B_N$ (step S401) for comparing read commands transmitted by the master control unit 200. Then, the controller 110 starts to receive the write command outputted by the master control unit 200 (step S403). The write command is set to write a first data stream into the peripheral unit 100 and the first data stream can be the data stream 500 in FIG. 5 or other data streams. After receiving the write command, the controller 110 then determines whether the first data stream includes the specific mark 502 as illustrated in FIG. 5 (step S405). If the first data stream does not include the specific mark 502, then the micro-processing unit 110a of the controller 110 writes the first data stream into the non-volatile memory 130 according to the address designated by the write command (step S407). On the contrary, if the first data stream includes the specific mark 502, the micro-processing unit 110a of the controller 110 then records the write token WT (such as the write token 506 in FIG. 5) in the first data stream in the buffer 110c. Afterwards, the specific mark 506 and the write token WT are removed from the first data stream to produce a second data stream (such as the C-APDU 504 illustrated in FIG. 5). A second data stream is then transmitted to the smart card chip 140 (step S409). As such, by verifying whether the first data stream includes the specific mark 502, the micro-processing unit 110a of the controller 110 can determine if the data stream is to be transmitted to the non-volatile memory 130 or the smart card chip 140. It should be noted that in other embodiments of the present invention not having the non-volatile memory 130, since the data stream 500 does not include the specific mark 502, the steps S405 and S407 in the flow chart of FIG. 4 are omitted. Moreover, the specific mark 502 does not need to be removed from the data stream 500 in the step S409. Instead, at least a portion of the data stream 500 is directly transmitted to the smart card chip 140. It should be noted that in another embodiment of the present invention, the second data stream is the first data stream. In other words, the micro-processing unit 110a does not remove the specific mark 502 or the write token WT from the first data stream. Instead, the first data stream is directly transmitted to the smart card chip 140 by the micro-processing unit 110a. Afterwards, the smart card chip 140 identifies the specific mark 502, the C-APDU 504, and the write token WT from the first data stream received. In addition, in the present embodiment, the write token WT in the first data stream is recorded in the buffer 110c as described above. In another embodiment of the present invention, the micro-processing unit 110a records the write token WT in the first data stream into the non-volatile memory 130.

After the second data stream is transmitted to the smart card chip 140, the micro-processing unit 110a of the controller 110 then waits to receive the read command transmitted from the master control unit 200 (step S411). The read command includes but is not limited to the read command transmitted by the master control unit 200 in step S309 of FIG. 3. Subsequently, the micro-processing unit 110a of the controller 110 determines whether the address designated by the received read command belongs to the plurality of logical blocks $B_1$ to $B_N$ (step S413). That is, the micro-processing unit 110a determines whether the received read command is set to read the data stored of the plurality of logical blocks $B_1$ to $B_N$. If the address designated by the read command does not belong to the plurality of logical blocks $B_1$ to $B_N$, then the micro-processing unit 110a reads the corresponding data according to the address designated by the read command (step S515) and transmits the data to the master control unit 200. On the contrary, if the address designated by the read command belongs to the plurality of logical blocks $B_1$ to $B_N$, then the micro-processing unit 110a determines whether the response message from the smart card chip 140 has been received (step S417). In the present embodiment, the response message is generated by the smart card chip 140 in response to receiving the second data stream and the response is a response-application protocol data unit (R-APDU). In the step S417, if the micro-processing unit 110a has received the response message from the smart card chip 140, then the micro-processing unit 110a combines the response message generated by the smart card chip 140 and the write token WT recorded in the buffer 110c (or the non-volatile memory 130) into a first response message (step S421). Next, the first response message is transmitted back to the master control unit 200 (step S423). The data structure of the first response message and the data structure of the data stream 600 illustrated in FIG. 6 are the same. Herein, the data region 602 is used to record the response message generated by the smart card chip 140. The write token region 604 is used to record the write token WT.

If, in the step S417, the micro-processing unit 110a has not received the response message of the smart card chip 140, then the micro-processing unit 110a of the controller 110 transmits a second response message to the master control unit 200 in response to the received read command (step S419). In the present embodiment, the data structure of the second response is also the same as the data structure of the data stream 600 illustrated in FIG. 6. Herein, the data in the data region 602 is of the preset pattern and the write token region 604 is used to record the write token WT. After the step S419 is completed, the micro-processing unit 110a then waits for a next read command of the master control unit 200 until the response message generated by the smart card chip 140 is received and the first response message is transmitted back to the master control unit 200.

Subsequent descriptions illustrate in detail how the indicator $B_P$ is reset in the step S317. Referring to FIG. 3 and FIGS. 7A to 7C, FIGS. 7A to 7C illustrate a method of setting an indicator $B_P$ according to an embodiment of the present invention. For the convenience of illustration, the plurality of logical blocks $B_1$ to $B_N$ shown in FIGS. 7A to 7C are sequentially arranged as a row. The plurality of logical blocks $B_1$ to $B_N$ are separated as a non-cached region 700 denoted by white area, and cached regions 702 and 704 denoted by dotted pattern. Data in logical blocks (e.g. a logical block $B_h$) in the non-cached region 700 has not been stored in the cache 212. Data in logical blocks (e.g. logical blocks $B_1$, $B_2$, and $B_N$) in the cached regions 702 and 704 has been stored in the cache 212.

As above, in the step S315, if the write token WT in the feedback data stream 600 has no corresponding relationship with the write token WT stored by the master control unit 200, the feedback data stream 600 is determined to be old data temporarily stored in the cache 212 rather than a new response message generated by the controller 110 in response to the current read command. Therefore, in the process of repeating the steps S309~S317 to reset the indicator $B_P$ as shown in FIG. 3, the executed plurality of read commands reads a plurality of logical blocks falling in the cached regions 702 and 704 and these read commands are executed in one or more rounds. As shown in FIGS. 7A to 7C, in searching for the logical block $B_h$ of the non-cached region 700, the execution of the read command takes a total of three rounds. The read commands are sequentially executed at time $t_1$, $t_2$, $t_3$, $t_4$, $t_5$, $t_6$, $t_7$, $t_8$, $t_9$, $t_{10}$, and $t_{11}$ to read data of blocks $B_1$, $B_a$, $B_b$, $B_c$, $B_2$, $B_d$, $B_f$, $B_3$, $B_g$, and $B_h$, wherein data of logical blocks $B_1$, $B_a$, $B_b$, $B_c$, $B_2$, $B_d$, $B_f$, $B_3$, and $B_g$ has been stored in the cache 212 and the data of the logical block $B_h$ has not been stored in the cache 212. Since the first read command executed at time $t_1$ is set to read the data of the logical block $B_1$, in the present embodiment, the start logical block $B_S$ is the logical block $B_1$. In addition, in the present embodiment, when the step S317 is executed, the indicator $B_P$ is set to be equal to the current indicator $B_P$ added with an interval d such that two logical blocks corresponding to two consecutively executed read commands are separated by (d−1) logical blocks. For example, two read commands executed at the times $t_1$ and $t_2$ respectively correspond to the logical blocks $B_1$ and $B_a$. The address of the logical block $B_a$ is equal to the address of the logical block $B_1$ plus d logical blocks of data shift such that the logical block $B_1$ and the logical block $B_a$ are separated by (d−1) logical blocks.

It should be noted that in the present embodiment, d is an integer greater than 2 so (d−1) is an integer greater than 1. As such, the logical block corresponding to the reset indicator $B_P$ and the logical block corresponding to the indicator $B_P$ that was previously reset are separated by at least one logical block of the plurality of logical blocks $B_1$~$B_N$. Because of the variable d, an interval between two logical blocks corresponding to two consecutively executed read commands is increased so that the time required to search for the non-cached region 700 is shortened.

Furthermore, when the step S317 is executed, if the current indicator $B_P$ added with the interval d exceeds the address of the last logical block $B_N$, the read commands of the next round are executed. The addresses of the plurality of logical blocks corresponding to the read commands to be executed in the next round are obtained by shifting the addresses of the logical blocks corresponding to the read commands executed in the current round by a preset number i of the logical blocks, wherein i is a positive integer and may be adjusted depending on requirement. For example, FIGS. 7A, 7B, and 7C respectively illustrate locations of the logical blocks corresponding to the read commands executed in the first, second, and third rounds. The addresses of the logical blocks $B_2$, $B_d$, $B_e$, and $B_f$ corresponding to the read commands in the second round are obtained by shifting the addresses of the logical blocks $B_1$, $B_a$, $B_b$, and $B_c$ corresponding to read commands in the first round by the preset number i of the logical blocks, wherein i is equal to 1. Similarly, the addresses of the logical blocks $B_3$, $B_g$, and $B_h$ corresponding to the read commands in the third round are obtained by shifting the addresses of the logical blocks $B_2$, $B_d$, and $B_e$ corresponding to the read command in the second round by the preset number i of the logical blocks. That is, the address of the start logical block in each round is the address of the start logical block of the previous round shifted by the number of logical blocks i. It should be further pointed out that in another embodiment, i is greater than or equal to 1 and smaller than d. Moreover, in the present embodiment, because the variable d is a fixed value, in the plurality of read commands executed in each round, any interval between two logical blocks corresponding to two consecutively executed read commands is a fixed value. For example, in the first round, the interval between the logical blocks $B_1$ and $B_a$ is equal to the interval between the logical blocks $B_a$ and $B_b$ and is also equal to the interval between the logical blocks $B_b$ and $B_c$.

It should also be noted that the above-mentioned plurality of rounds are defined by determining whether a difference value is positive or negative, wherein the difference value is the difference between the addresses of two logical blocks respective corresponding to the indicator $B_P$ before and after being reset and is calculated by subtracting the address of the logical block corresponding to the indicator $B_P$ before being reset from the address of the logical block corresponding to the indicator $B_P$ after being reset. Take FIGS. 7A to 7C as an example. The two read commands executed at times $t_4$ and $t_5$ respectively correspond to the logical blocks $B_c$ and $B_2$. Therefore, the indicator $B_P$ is respectively set as $B_c$ and $B_2$ before and after time $t_5$. Furthermore, since the difference value obtained by subtracting the address of the logical block $B_c$ from the address of the logical block $B_2$ is negative, the two read commands executed at times $t_4$ and $t_5$ are then grouped to different rounds. Furthermore, take FIG. 7B as an example. The two read commands executed at times $t_6$ and $t_7$ respectively correspond to the logical blocks $B_d$ and $B_e$. Therefore, the indicator $B_P$ is respectively set as $B_d$ and $B_e$ before and after time $t_7$. Moreover, since the difference value obtained by subtracting the address of the logical block $B_d$ from the address of the logical block $B_e$ is positive, the two read commands executed at times $t_6$ and $t_7$ are then grouped to the same round.

Figure 8A:
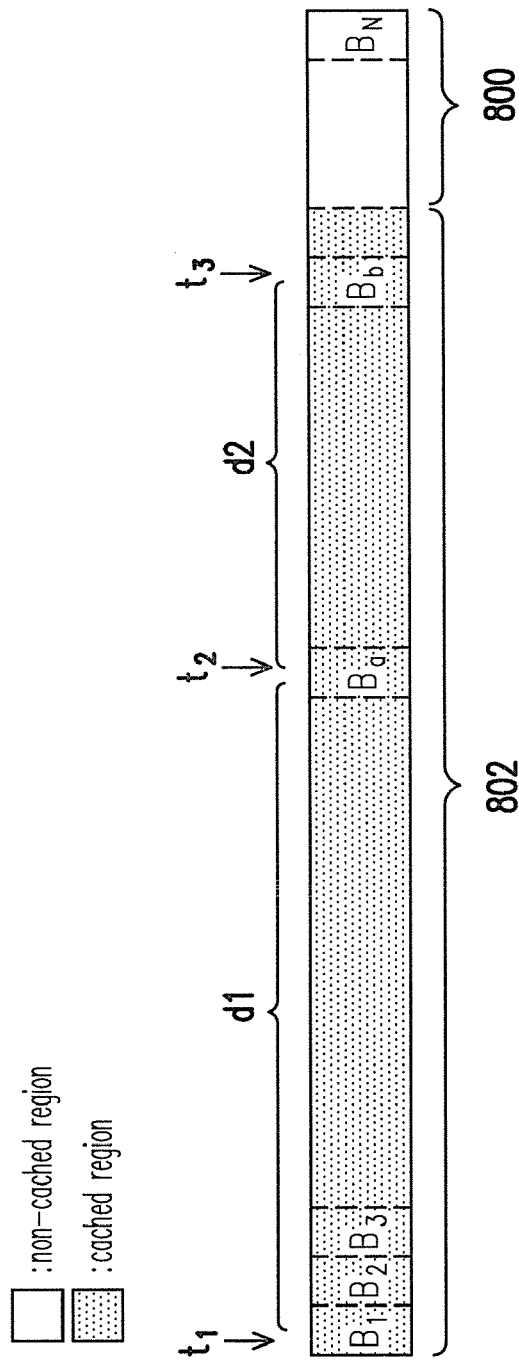
FIG. 8A to FIG. 8B illustrate a method of setting an indicator according to another embodiment of the present invention.
Figure 8B:
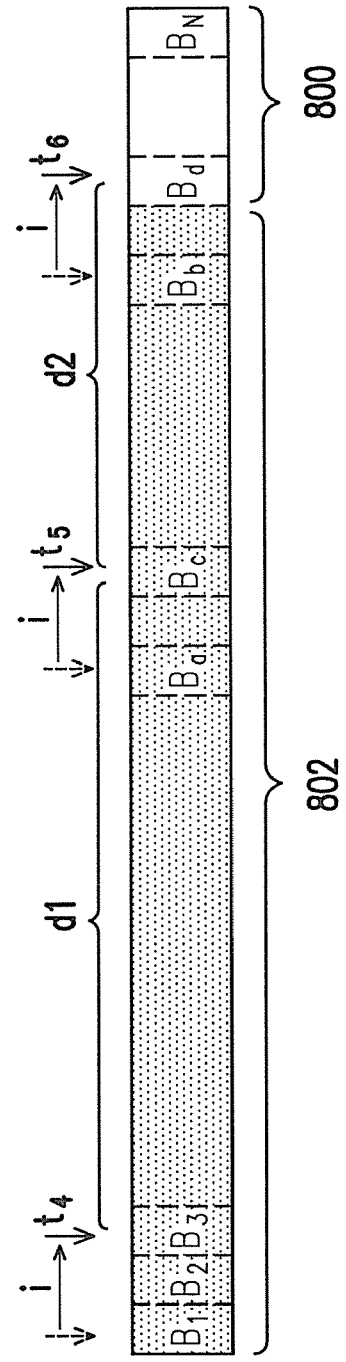

Referring to FIGS. 8A and 8B, FIGS. 8A and 8B illustrate a method of setting the indicator $B_P$ according to another embodiment of the present invention. In the present embodiment, the plurality of logical blocks $B_1$ to $B_N$ are divided into a non-cached region 800 and a cached region 802. Data in the logical blocks in the non-cached region 800 has not been stored in the cache 212 and data in the logical blocks in the cached region 802 has been stored in the cache 212. In the present embodiment, the number of logical blocks separating the logical blocks corresponding to the plurality of read commands executed in each round sequentially decreases.

Specifically, in the present embodiment, in the logical blocks corresponding to the plurality of read commands in each round, with the exception of the two logical blocks corresponding to the first and the last read command in the round, any logical block corresponding to an executed read command in the round is separated with a logical block corresponding to a previously executed read command by a number of logical blocks, wherein the number of logical blocks is smaller than a number of logical blocks separating the logical block with a logical block corresponding to a next executed read command. As shown in FIGS. 8A and 8B, read commands are sequentially executed at times $t_1$, $t_2$, $t_3$, $t_4$, $t_5$, $t_6$ to read data of the logical blocks $B_1$, $B_a$, $B_b$, $B_3$, $B_c$, and $B_d$, wherein an interval d2 is smaller than an interval d1 and the addresses of the logical blocks $B_3$, $B_c$, and $B_d$ corresponding to the read commands executed in the second round are obtained by shifting the addresses of the logical blocks $B_1$, $B_a$, and $B_b$ corresponding to the read commands executed in the first round by the preset number i of the logical blocks, i being equal to 2. In addition, in the first round, with the exception of the logical block corresponding to the first executed read command, each logical block corresponding to each executed read command in the first round is separated with a logical block corresponding to a previously executed read command by a number of logical blocks, wherein the number of blocks is determined by the total number of the plurality of logical blocks and the location of the logical block corresponding to the previously executed read command. For example, the total number of logical blocks $B_1 \sim B_N$ is N and the logical block corresponding to the first executed read command in the first round is $B_1$. Therefore, the interval d1 is equal to (N−1)/2. Suppose that the logical block $B_a$ corresponding to the second executed read command in the first round is the $a^{th}$ logical block in the logical blocks $B_1 \sim B_N$ and then the interval d2 is approximately equal to (N−a)/2. If the value of (N−1)/2 or (N−a)/2 is not an integer, the value is rounded off to the closest integer to decide the intervals d1 and d2.

Referring to FIGS. 9A to 9C, FIGS. 9A to 9C illustrate a method of setting the indicator $B_P$ according to another embodiment of the present invention. In the present embodiment, the plurality of logical blocks $B_1$ to $B_N$ are divided into a non-cached region 900 and cached regions 902 and 904. Data in the logical blocks in the non-cached region 900 has not been stored in the cache 212 and data in the logical blocks in the cached regions 902 and 904 has been stored in the cache 212. In the present embodiment, as shown in FIG. 9A, in the first round, the start logical block $B_S$ is set to be a first block between the first logical block $B_1$ and the last logical block $B_N$. In addition, as shown in FIG. 9B, the first read command to be executed in the second round is set to read a second block $B_a$ between the first logical block $B_1$ and the first block $B_S$. The second read command to be executed in the second round is set to read a third block $B_b$ between the last logical block $B_N$ and the first block $B_S$. If, upon completion of the read commands of the second round, logical blocks in the non-cached region 900 are not found, read commands of the third round are continuously executed. The four read commands to be executed in the third round are respectively set to read a fourth block $B_c$ between the first logical block $B_1$ and the second block $B_a$; a fifth block $B_d$ between the second block $B_a$ and the first block $B_s$; a sixth block $B_e$ between the first block $B_s$ and the third block $B_b$; and a seventh block $B_f$ between the third block $B_b$ and the last logical block $B_N$. When the logical blocks in the non-cached region 900 are found, subsequent operations to read the logical blocks are not executed. Taking FIG. 9C as an example, in the third round, since the sixth block $B_e$ of the non-cached region 900 has been read, the operation to read the seventh block $B_f$ is not carried out.

As compared to the above embodiment, any interval between two logical blocks corresponding to two consecutively executed read commands is a fixed value or sequentially decreases. In another embodiment of the present invention, in the plurality of read commands executed in each round, any interval between two logical blocks corresponding to two consecutively executed read commands is a variable interval. Furthermore, in another embodiment of the present invention, the number of logical blocks separating the logical blocks corresponding to the plurality of executed read commands sequentially increases until reaching a threshold. Referring to FIG. 10 and FIG. 11, FIG. 10 and FIG. 11 illustrate a method of setting the indicator $B_P$ according to another embodiment of the present invention. In FIG. 10, the logical blocks $B_1 \sim B_N$ are divided into a non-cached region 1000 and a cached region 1002. In FIG. 11, the logical blocks $B_1 \sim B_N$ are divided into a non-cached region 1100 and cached regions 1102 and 1104. Data in the logical blocks in the non-cached regions 1000 and 1100 has not been stored in the cache 212 and data in the logical blocks in the cached regions 1002, 1102, and 1104 has been stored in the cache 212. In the two embodiments, the start logical block $B_S$ may be set to be any block in the logical blocks $B_1 \sim B_N$, wherein intervals d1, d2, and d3 are variable intervals and d1<d2<d3. Furthermore, the number of logical blocks separating the logical blocks corresponding to the plurality of executed read commands sequentially increases from (d1−1) until reaching a threshold (d3−1). In other words, each time when the indicator $B_P$ is reset, an interval d1, d2, or d3 is accumulated to the indicator $B_P$ to reset the indicator $B_P$. If the indicator accumulated with the intervals d1, d2, or d3 exceeds an address range of the plurality of logical blocks $B_1 \sim B_N$, then the reset indicator is equal to the accumulated indicator subtracted by the total capacity of the plurality of logical blocks $B_1 \sim B_N$ so that the reset indicator $B_P$ is equal to the accumulated indicator $B_P$ subtracted by the total capacity of the plurality of logical blocks $B_1 \sim B_N$. In addition, with the sequence of resetting the indicator $B_P$ (e.g. the sequence of times $t_1$, $t_2$, $t_3$, $t_4$, and $t_5$ in FIG. 10 and FIG. 11), the interval accumulated to the indicator $B_P$ sequentially increases until reaching the largest interval d3.

From the methods of setting the indicator $B_P$ in the above embodiments, the two logical blocks corresponding to the indicator $B_P$ before and after the indicator $B_P$ is reset are separated by at least one logical block. As such, the interval separating the logical block corresponding to each executed read command and the logical block corresponding to the previous or next read command is increased so as to achieve the goal of shortening the time consumed to search for the non-cached region. However, it should be noted that the embodiments of the present invention are not limited to the necessity of separating two logical blocks corresponding to two consecutively executed read commands by at least one logical block. In detail, in order to achieve the goal of shortening the search time, only increasing some of the intervals can is can attain the objective and increasing all intervals is not necessary. Alternatively speaking, each of the intervals accumulated to the indicator is equal to or greater than the capacity of one logical block of the plurality of logical blocks $B_1 \sim B_N$ and at least one of the intervals is greater than or equal to twice of the capacity of a single logical block of the plurality of logical blocks $B_1 \sim B_N$.

Figure 12:
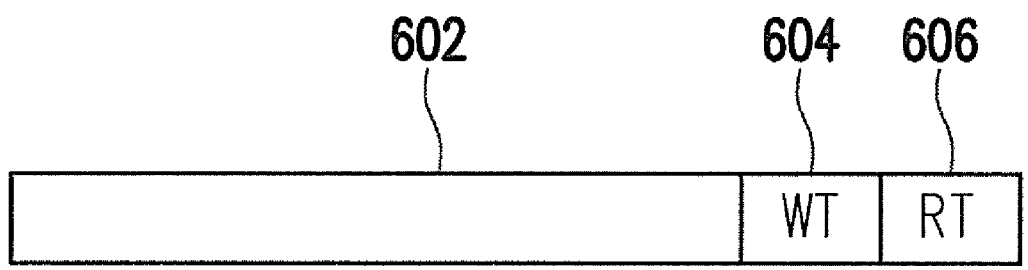
FIG. 12 illustrates a structure of a data stream transmitted from the controller back to the master control unit according to another embodiment of the present invention.

Furthermore, in another embodiment of the present invention, a read token RT is added by the controller 110 to the response message transmitted back to the master control unit 200 to further ensure that when a collision occurs in the write token WT generated by the master control unit 200, the data processing module 206 of the master control unit 200 can still accurately determine whether the response message generated by the smart card chip 140 has been received. Referring to FIG. 12, FIG. 12 illustrates a structure of a data stream 1200 transmitted from the controller 110 back to the master control unit 200 according to another embodiment of the present invention. In addition to the data region 602 and the write token region 604 of the above-mentioned data stream 600, the data stream 1200 further includes a read token region 606. The read token region 606 is used to record a read token RT generated by the micro-processing unit 110a of the controller 110. Moreover, the functions of the data region 602 and the write token region 604 are illustrated above and thus not repeated herein. Although the read token region 606 is located after the write token region 604 as illustrated in FIG. 12, the present invention is not limited thereto. For example, the locations of the write token region 604 and the read token region 606 on the data stream 1200 can be interchanged. Alternatively, the write token region 604 and the read token region 606 can each be located on two ends or a same end of the data stream 1200.

Figure 13:
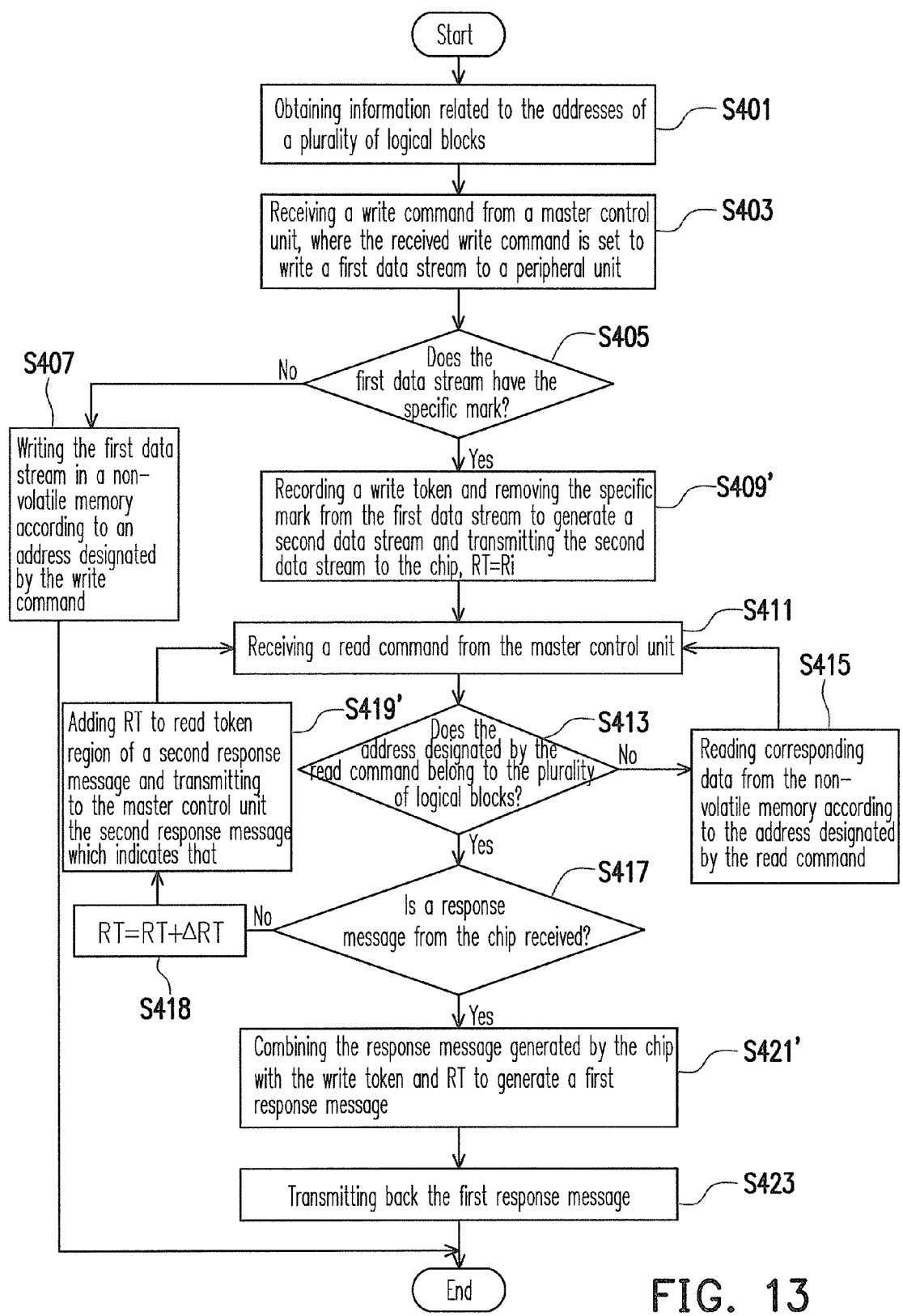
FIG. 13 is a flow chart illustrating operations of a peripheral unit according to the second embodiment of the present invention.

Referring to FIG. 13, FIG. 13 is a flow chart illustrating operations of a peripheral unit 100 according to the second embodiment of the present invention. The flow of operations of FIG. 13 is mostly similar to the flow of operations of FIG. 4 with differences being an additional step S418 in FIG. 13 and replacement of steps S409, S419, and S421 in FIG. 4 with steps S409', S419', and S421' in FIG. 13. In the step S419, after the controller 110 determines that the received first data stream has _ to be transmitted to the smart card chip 140, the controller 110 sets the read token RT as an initial read token Ri. In the step S418, the read token RT is accumulated with a difference value ΔRT. Thereafter, in the step S419', the current read token RT is added to the read token region 606 of the second response message 1200 to be transmitted back to the master control unit 200. Furthermore, in the step S421', the response message generated by the smart card chip 140 is combined with the write token WT and the read token RT as a first response message.

Figure 14:
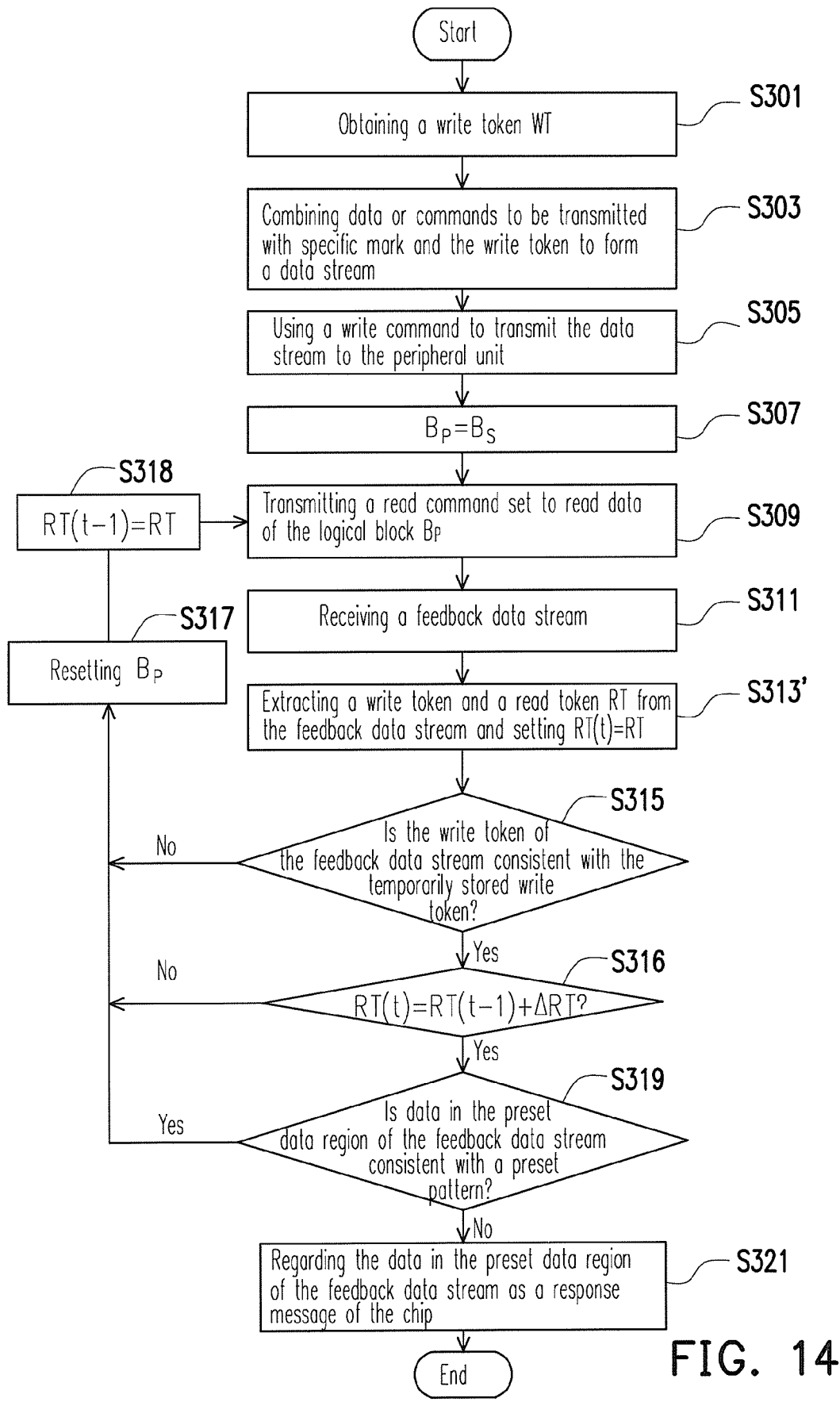
FIG. 14 is a flow chart illustrating operations of a master control unit according to the second embodiment of the present invention.

Referring to FIG. 14, FIG. 14 is a flow chart illustrating operations of a master control unit 200 according to the second embodiment of the present invention. The flow of operations of FIG. 14 is mostly similar to the flow of operations of FIG. 3 with differences being an additional steps of S316 and S318 in FIG. 14 and replacement of the step S313 in FIG. 3 with a step S313' in FIG. 14. In the step S313', the write token WT and the read token RT are both extracted from the feedback data stream 600 and a parameter RT(t) is set to equal to the extracted read token RT. The parameter RT(t) is used to represent the current read token RT extracted by the master control unit 200. In addition, another parameter RT(t−1) is used to represent the previous read token RT extracted by the master control unit 200. In the step S316', the data processing module 206 of the master control unit 200 determines whether the extracted read token RT differs with the read token previously extracted by the master control unit by the preset value ΔRT (i.e. whether the value of the parameter RT(t) is equal to the sum of the parameter RT(t−1) and the preset value ΔRT). If RT(t)=[RT(t−1)+ΔRT], the step S319 is carried out; otherwise, if RT(t)≠[RT(t−1)+ΔRT], the step S317 is performed. In the step S318', the parameter RT(t−1) is set to equal to the previous extracted read token RT so as to update the value of the read token RT previously extracted by the master control unit 200 represented by the parameter RT(t−1) before extracting the next read token RT.

In light of the above, in exemplary embodiments of the present invention, when searching for logical blocks whose data is not stored in the cache of the master control unit, the address of the logical block corresponding to the read command is set by jumping a plurality of logical blocks to increase the process of searching for the non-cached region. As such, the master control unit can effectively avoid the logical blocks whose data has been stored in the cache and thereby promote transmission efficiency between chips of the master control unit and the peripheral unit.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for searching for a specific logical block from a peripheral unit coupled to a master control unit, data of the specific logical block being not stored in a cache of the master control unit, the method comprising:
    (a) the master control unit setting an indicator such that the indicator is corresponding to one of a plurality of logical blocks of the peripheral unit;
    (b) executing a read command set to read data from the logical block corresponding to the indicator;
    (c) the master control unit receiving a feedback data stream, the feedback data stream being generated as a result of execution of the read command;
    (d) the master control unit extracting a write token from the feedback data stream;
    (e) the master control unit determining whether the extracted write token and a write token stored by the master control unit have a corresponding relationship; and
    (f) when the extracted write token and the write token stored by the master control unit do not have the corresponding relationship, resetting the indicator and repeating the steps (b), (c), (d), and (e) until another write token extracted in the repeated step (d) is determined, in the repeated step (e), to have the corresponding relationship with the write token stored by the master control unit, wherein a logical block corresponding to a current reset indicator and a logical block corresponding to a previous reset indicator are separated by at least one logical block of the plurality of logical blocks.

2. The method according to claim 1, wherein the step (d) further comprises extracting a read token from the feedback data stream and the method further comprises:
    (g) the master control unit determining whether a current extracted read token and a previous read token extracted by the master control unit differ by a preset value; and
    (h) when the current extracted read token and the previous read token do not differ by the preset value, resetting the indicator and repeating the steps (b), (c), (d), (e), (f), and (g) until the read token extracted in the repeated step (d) is determined, in the repeated step (g), to differ with the previous read token by the preset value.

3. The method according to claim 1, wherein all read commands are executed in a plurality of rounds, which are defined by determining whether a difference value between addresses of two logical blocks corresponding to two consecutively executed read commands is a positive value or a negative value.

4. The method according to claim 3, wherein any interval between two logical blocks corresponding to two read commands consecutively executed in the same round is a fixed value.

5. The method according to claim 4, wherein the plurality of rounds includes a first round and a second round, addresses of logical blocks corresponding to read commands executed in the second round are obtained by shifting addresses of logical blocks corresponding to read commands executed in the first round by a preset number of logical blocks.

6. The method according to claim 3, wherein among logical blocks corresponding to the read commands executed in each round, with the exception of two logical blocks corresponding to a firstly executed read command and a lastly executed read command in the round, any logical block corresponding to an other read command executed in the round is separated from a logical block corresponding to a previously executed read command by a first number of logical blocks and separated from a logical block corresponding to a next executed read command by a second number of logical blocks, the first number is less than the second number.

7. The method according to claim 6, wherein the plurality of rounds includes a first round and a second round, an address of a logical block corresponding to a read command firstly executed in the second round is obtained by shifting an address of a logical block corresponding to a read command firstly executed in the first round by a preset number of logical blocks.

8. The method according to claim 6, wherein with the exception of the logical block corresponding to the read command firstly executed in the first round, any logical block corresponding to an other read command executed in the first round is separated from a logical block corresponding to a previous read command by a number of logical blocks, the number is determined by the total number of the plurality of logical blocks and a location of the logical block corresponding to the previous read command.

9. The method according to claim 3, wherein in a first round of the plurality of rounds, a single read command is executed to read a first block between a first logical block and a last logical block of the plurality of logical blocks; and wherein two read commands to be executed in a second round of the plurality of rounds are respectively set to read a second block between the first logical block and the first block and to read a third block between the last logical block and the first block.

10. The method according to claim 9, wherein four read commands to be executed in a third round of the plurality of rounds are respectively set to read a fourth block between the first logical block and the second block, to read a fifth block between the second block and the first block, to read a sixth block between the first block and the third block, and to read a seventh block between the third block and the last logical block.

11. The method according to claim 3, wherein any interval between two logical blocks corresponding to two read commands consecutively executed in the same round is a fixed value.

12. The method according to claim 1, wherein each time the indicator is reset, an interval is accumulated to the indicator to reset the indicator, and when the indicator accumulated with the interval exceeds an address range of the plurality of logical blocks, then the reset indicator is equal to the accumulated indicator subtracted by the total capacity of the plurality of logical blocks.

13. The method according to claim 12, wherein the interval is a variable interval.

14. The method according to claim 13, wherein the interval sequentially increases to a largest interval according to an order in which the indicator is reset.

15. The method according to claim 1, wherein all command and data transmission between the master control unit and the peripheral unit pass through the cache.

16. The method according to claim 1, wherein when the extracted write token and the write token stored by the master control unit have the corresponding relationship, the extracted write token and the write token stored by the master control unit are consistent.

17. A master control unit, coupled to a peripheral unit, the master control unit comprising:
a cache for storing data; and
a data processing module for searching for a specific logical block from the peripheral unit, data of the specific logical block being not stored in the cache;
wherein the data processing module sets an indicator such that the indicator correspond to a logical block of a plurality of logical blocks of the peripheral unit and then receives a feedback data stream generated as a result of execution of a read command set to read data from the logical block corresponding to the indicator;
wherein the data processing module extracts a write token from the feedback data stream and determines whether the extracted write token has a corresponding relationship with a write token stored by the master control unit, and when the extracted write token and the write token stored by the master control unit do not have the corresponding relationship, the indicator is then reset until the data processing module extracts a write token having the corresponding relationship with the write token stored by the master control unit from subsequently received feedback data streams; each of the feedback data streams subsequently received by the data processing module is generated as a result of execution of subsequent read commands, each of the subsequent read commands is set to read data from a logical block corresponding to the reset indicator; and
wherein a logical block corresponding to a current reset indicator and a logical block corresponding to a previous reset indicator are separated by at least one logical block of the plurality of logical blocks.

18. The master control unit according to claim 17, wherein when the extracted write token and the write token stored by the master control unit have the corresponding relationship, the data processing module further extracts a read token from the feedback data stream and determines whether a current read token and a previous read token differ by a preset value; and when the current read token and the previous read token do not differ by the preset value, the indicator is reset until the data processing module extracts a read token differing with a previous read token by the preset value from the subsequently received feedback data streams.

19. The master control unit according to claim 17, wherein all read commands are executed in a plurality of rounds, which are defined by determining whether a difference value between addresses of two logical blocks corresponding to two consecutively executed read commands is a positive value or a negative value.

20. The master control unit according to claim 19, wherein any interval between two logical blocks corresponding to two read commands consecutively executed in the same round is a fixed value.

21. The master control unit according to claim 20, wherein the plurality of rounds includes a first round and a second round, addresses of logical blocks corresponding to read commands executed in the second round are obtained by shifting addresses of logical blocks corresponding to read commands executed in the first round by a preset number of logical blocks.

22. A data processing system, comprising:
a peripheral unit; and
a master control unit coupled to the peripheral unit and comprising a cache and a data processing module, the cache used for storing data and the data processing module used for searching for a specific logical block from the peripheral unit, data of the specific logical block being not stored in the cache;
wherein the data processing module sets an indicator such that the indicator correspond to a logical block of a plurality of logical blocks of the peripheral unit and then receives a feedback data stream generated as a result of execution of a read command set to read data from the logical block corresponding to the indicator;
wherein the data processing module extracts a write token from the feedback data stream and determines whether the extracted write token has a corresponding relationship with a write token stored by the master control unit, and when the extracted write token and the write token stored in the master control unit do not have the corresponding relationship, the indicator is then reset until the data processing module extracts a write token having the corresponding relationship with the write token stored by the master control unit from subsequently received feedback data streams; each of the feedback data streams subsequently received by the data processing module is generated as a result of execution of subsequent read commands, each of the subsequent read commands is set to read data from a logical block corresponding to the reset indicator; and wherein a logical block corresponding to a current reset indicator and a logical block corresponding to a previous reset indicator are separated by at least one logical block of the plurality of logical blocks.

23. The data processing system according to claim 22, wherein the peripheral unit comprises:
a bus connection interface coupled to the master control unit for receiving commands and data from the master control unit; and
a micro-processing unit coupled to the bus connection interface for executing commands received by the bus connection interface from the master control unit.

24. The data processing system according to claim 23, wherein the peripheral unit further comprises:
a non-volatile memory used for storing data; and
a memory interface coupled between the non-volatile memory and the micro-processing unit for accessing the non-volatile memory.

25. A method executed by a master control unit for searching for a specific memory area from a peripheral unit, the master control unit being coupled to the peripheral unit and storing a write token, the method comprising:
(a) setting an indicator corresponding to a logical block of a plurality of logical blocks of the peripheral unit;
(b) executing a read command set to read data from the logical block corresponding to the indicator;
(c) receiving a feedback data stream generated as a result of execution of the read command;
(d) determining whether the feedback data stream and the write token have a corresponding relationship according to the feedback data stream; and
(e) once the feedback data stream and the write token do not have the corresponding relationship, accumulating a corresponding interval to the indicator to reset the indicator and repeating the steps (b), (c), and (d) until a received feedback data stream and the write token have the corresponding relationship;
wherein each of the interval(s) accumulated to the indicator is equal to or greater than the capacity of one logical block of the plurality of logical blocks, and at least one of the interval(s) is greater than or equal to twice of the capacity of a single logical block of the plurality of logical blocks.

26. The method according to claim 25, wherein each logical block of the plurality of logical blocks has the same capacity.

27. The method according to claim 25, wherein the step (d) further comprises extracting another write token from the feedback data stream, and when the extracted wrote token is consistent with the write token stored by the master control unit, it is determined that a feedback data stream has the corresponding relationship with the write token.

28. A master control unit, coupled to a peripheral unit and storing a write token, the master control unit comprising:
a cache for storing data; and
a data processing module for searching for a specific logical block from the peripheral unit, data of the specific logical block being not stored in the cache;
wherein the data processing module sets an indicator such that the indicator correspond to a logical block of a plurality of logical blocks of the peripheral unit and then receives a feedback data stream generated as a result of execution of a read command set to read data from the logical block corresponding to the indicator;
wherein the data processing module determines whether the feedback data stream and the write token have a corresponding relationship according to the feedback data stream; once the feedback data stream and the write token do not have the corresponding relationship, a corresponding interval is accumulated to the indicator to reset the indicator until a received feedback data stream and the write token have the corresponding relationship; each subsequent feedback data stream received by the data processing module is generated as a result of execution of subsequent read commands, each of the subsequent read commands is set to read data from a logical block corresponding to the reset indicator; and
wherein each of the interval(s) accumulated to the indicator is equal to or greater than the capacity of one logical block of the plurality of logical blocks, and at least one of the interval(s) is greater than or equal to twice of the capacity of a single logical block of the plurality of logical blocks.

29. The master control unit according to claim 28, wherein the data processing module extracts another write token from the feedback data stream, and when the extracted write token is consistent with the write token stored by the master control unit, the data processing module determines that a feedback data stream has the corresponding relationship with the write token.

30. A data processing system, comprising:
a peripheral unit; and
a master control unit coupled to the peripheral unit and storing a write token and comprising a cache and a data processing module, the cache used for storing data, and the data processing module used for searching for a specific logical block from the peripheral unit, data of the specific logical block being not stored in the cache;
wherein the data processing module sets an indicator such that the indicator correspond to a logical block of a plurality of logical blocks of the peripheral unit and then receives a feedback data stream generated as a result of execution of a read command set to read data from the logical block corresponding to the indicator;
wherein the data processing module determines whether the feedback data stream and the write token have a corresponding relationship according to the feedback data stream; once the feedback data stream and the write token do not have the corresponding relationship, a corresponding interval is accumulated to the indicator to reset the indicator until a received feedback data stream and the write token have the corresponding relationship; each subsequent feedback data stream subsequently received by the data processing module is generated as a result of execution of subsequent read commands, each of subsequent read commands is set to read data from a logical block corresponding to the reset indicator; and
wherein each of the interval(s) accumulated to the indicator is equal to or greater than the capacity of one logical block of the plurality of logical blocks and at least one of the interval(s) accumulated is greater than or equal to twice of the capacity of a single logical block of the plurality of logical blocks.

* * * * *